US012734893B2

(12) United States Patent
Rahimifard et al.

(10) Patent No.: US 12,734,893 B2
(45) Date of Patent: Sep. 15, 2026

(54) SYSTEM AND METHOD FOR MONITORING HEALTH OF DRIVE UNIT GEARS

(71) Applicant: GM Global Technology Operations LLC, Detroit, MI (US)

(72) Inventors: Sara Sadat Rahimifard, Richmond Hill (CA); Ehsan Jafarzadeh, Toronto (CA); Paola Scarassatti Sant Anna, Lake Orion, MI (US); Hossein Sadjadi, Thornhill (CA)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

(21) Appl. No.: 18/390,683

(22) Filed: Dec. 20, 2023

(65) Prior Publication Data

US 2025/0206142 A1 Jun. 26, 2025

(51) Int. Cl.

| | |
|---|---|
| ***B60L 3/12*** | (2006.01) |
| ***B60L 3/00*** | (2019.01) |
| ***B60Q 9/00*** | (2006.01) |
| ***G07C 5/08*** | (2006.01) |
| *G07C 5/00* | (2006.01) |

(52) U.S. Cl.

CPC ............... *B60L 3/12* (2013.01); *B60L 3/0061* (2013.01); *B60Q 9/00* (2013.01); *G07C 5/0808* (2013.01); *B60L 2240/486* (2013.01); *G07C 5/008* (2013.01)

(58) Field of Classification Search

CPC .... B60L 3/12; B60L 3/0061; B60L 2240/486; B60Q 9/00; G07C 5/0808; G07C 5/008

See application file for complete search history.

(56) References Cited

U.S. PATENT DOCUMENTS

| | | | | |
|---|---|---|---|---|
| 4,931,949 | A * | 6/1990 | Hernandez | G01M 13/021 73/660 |
| 2016/0189050 | A1 * | 6/2016 | Jaramillo-Velasquez | G06N 7/01 706/52 |
| 2018/0165898 | A1 * | 6/2018 | Isom | B64C 27/32 |
| 2019/0130669 | A1 * | 5/2019 | Boggio | G05B 23/0254 |

* cited by examiner

*Primary Examiner* — Adnan M Mirza

(74) *Attorney, Agent, or Firm* — Honigman LLP; Matthew H. Szalach

(57) ABSTRACT

A computer-implemented method includes receiving sensor data associated with a drive unit and one or more vehicle operating parameters, transforming sensor data into a phase domain based on the one or more vehicle operating parameters, after transforming the sensor data, filtering the sensor data to isolate a gear fault signature from one or more operational signatures associated with the drive unit, separating the gear fault signature into a plurality of gear fault signature segments, extracting one or more health indicators from each of the gear fault signature segments, determining whether each of the one or more extracted health indicators exceeds a threshold health indicator, when at least one of the one or more extracted health indicators exceeds the threshold health indicator, generating a gear health notification indicating a fault condition of the drive unit.

20 Claims, 4 Drawing Sheets

SYSTEM AND METHOD FOR MONITORING HEALTH OF DRIVE UNIT GEARS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method for monitoring health of a gear, and more particularly, to a system and method for determining health of a gear for a drive unit of an electric vehicle.

Failure of drive unit gears in electric and autonomous vehicles can lead to loss of propulsion. Failures can occur in connection with various degradation conditions, including, but not limited to, pitting, wear, and tooth breakage. Currently, understanding when a gear is deteriorating is not objectively measured, and is up to the customer or driver to notice gear degradation by any abnormal noise or, in the worst case scenario, by losing vehicle propulsion when a gear failure happens. In order to prevent gear failure, predetermined service intervals, such as period-of-time or mileage, can be used. Thus, current methods of measuring gear degradation may not accurately reflect the actual health state of a gear unit, thereby leading to unnecessary servicing or failure to service in advance of a failure. These shortcomings can be addressed using a prognostic method capable of early detection and isolation of degraded gears. The system and method provided in the present disclosure continuously monitor and estimate a fault severity of a gear based on fault signatures extracted from a measured vibration spectrum for the gear.

SUMMARY

An aspect of the disclosure provides a computer-implemented method that, when executed by data processing hardware of a vehicle having a drive unit, causes the data processing hardware to perform operations. The operations include receiving sensor data associated with the drive unit and one or more vehicle operating parameters, transforming sensor data into a phase domain based on the one or more vehicle operating parameters, after transforming the sensor data, filtering the sensor data to isolate a gear fault signature from one or more operational signatures associated with the drive unit, separating the gear fault signature into a plurality of gear fault signature segments, extracting one or more health indicators from each of the gear fault signature segments, determining whether each of the one or more extracted health indicators exceeds a threshold health indicator, when at least one of the one or more extracted health indicators exceeds the threshold health indicator, generating a gear health notification indicating a fault condition of the drive unit.

Aspects of the disclosure may include one or more of the following optional features. In some implementations, the operations further include determining whether one or more of the vehicle operating parameters exceeds a vehicle operating parameter threshold, when one or more of the vehicle operating parameters exceeds the vehicle operating parameter threshold, generating enabling instructions to initiate the operation of transforming the sensor data. In some examples, the operations include enhancing the gear fault signature. Optionally, enhancing the gear fault signature includes applying at least one of a wavelet filter or an envelope filter to the gear fault signature.

In some configurations, the operations include applying a Fast Fourier transformation to each of the gear fault signature segments. In some implementations, the operations include normalizing each of the extracted health indicators. In some examples, the operations include aggregating each of the extracted health indicators to determine a health indicator score. Optionally, determining the health indicator score includes applying a health indicator weight value to each of the extracted health indicators.

Another aspect of the disclosure provides a system for a vehicle having a drive unit. The system includes data processing hardware and memory hardware in communication with the data processing hardware, the memory hardware storing instructions that, when executed on the data processing hardware, cause the data processing hardware to perform operations. The operations include receiving a vibration signal associated with the drive unit and one or more vehicle operating parameters, transforming the sensor data into a phase domain based on the one or more vehicle operating parameters, after transforming the sensor data, filtering the sensor data to isolate a gear fault signature from one or more operational signatures associated with the drive unit, separating the gear fault signature into a plurality of gear fault signature segments, extracting one or more health indicators from each of the gear fault signature segments, determining whether each of the one or more extracted health indicators exceeds a threshold health indicator, and when at least one of the one or more extracted health indicators exceeds the threshold health indicator, generating a gear health notification indicating a fault condition of the drive unit.

This aspect of the disclosure may include one or more of the following optional features. In some examples, the operations include determining whether one or more of the vehicle operating parameters exceeds a vehicle operating parameter threshold, and when one or more of the vehicle operating parameters exceeds the vehicle operating parameter threshold, generating enabling instructions to initiate the operation of transforming the sensor data. In some implementations, the operations include enhancing the gear fault signature. In some configurations, enhancing the gear fault signature includes applying at least one of a wavelet filter or an envelope filter to the gear fault signature.

In some examples, the operations include applying a Fast Fourier transformation to each of the gear fault signature segments. In some implementations, the operations include normalizing each of the extracted health indicators. In some configurations, the operations include aggregating each of the extracted health indicators to determine a health indicator score. Optionally, determining the health indicator score includes applying a health indicator weight value to each of the extracted health indicators.

Another aspect of the disclosure provides a vehicle including a drive unit, data processing hardware, and memory hardware in communication with the data processing hardware, the memory hardware storing instructions that, when executed on the data processing hardware, cause the data processing hardware to perform operations. The operations include receiving a vibration signal associated with the drive unit and one or more vehicle operating parameters, transforming the sensor data into a phase domain based on the one or more vehicle operating parameters, after transforming the sensor data, filtering the sensor data to isolate a gear fault signature from one or more operational signatures associated with the drive unit, separating the gear fault signature into a plurality of gear fault signature segments, extracting one or more health indicators from each of the gear fault signature segments, determining whether each of the one or more extracted health indicators exceeds a threshold health indicator, and when at least one of the one or more extracted health indicators exceeds the threshold health indicator, generating a gear health notification indicating a fault condition of the drive unit.

This aspect of the disclosure may include one or more of the following optional features. In some examples, the operations include determining whether one or more of the vehicle operating parameters exceeds a vehicle operating parameter threshold, and when one or more of the vehicle operating parameters exceeds the vehicle operating parameter threshold, generating enabling instructions to initiate the operation of transforming the sensor data. In some configurations, the operations further include enhancing the gear fault signature. Optionally, enhancing the gear fault signature includes applying at least one of a wavelet filter or an envelope filter to the gear fault signature.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1A:
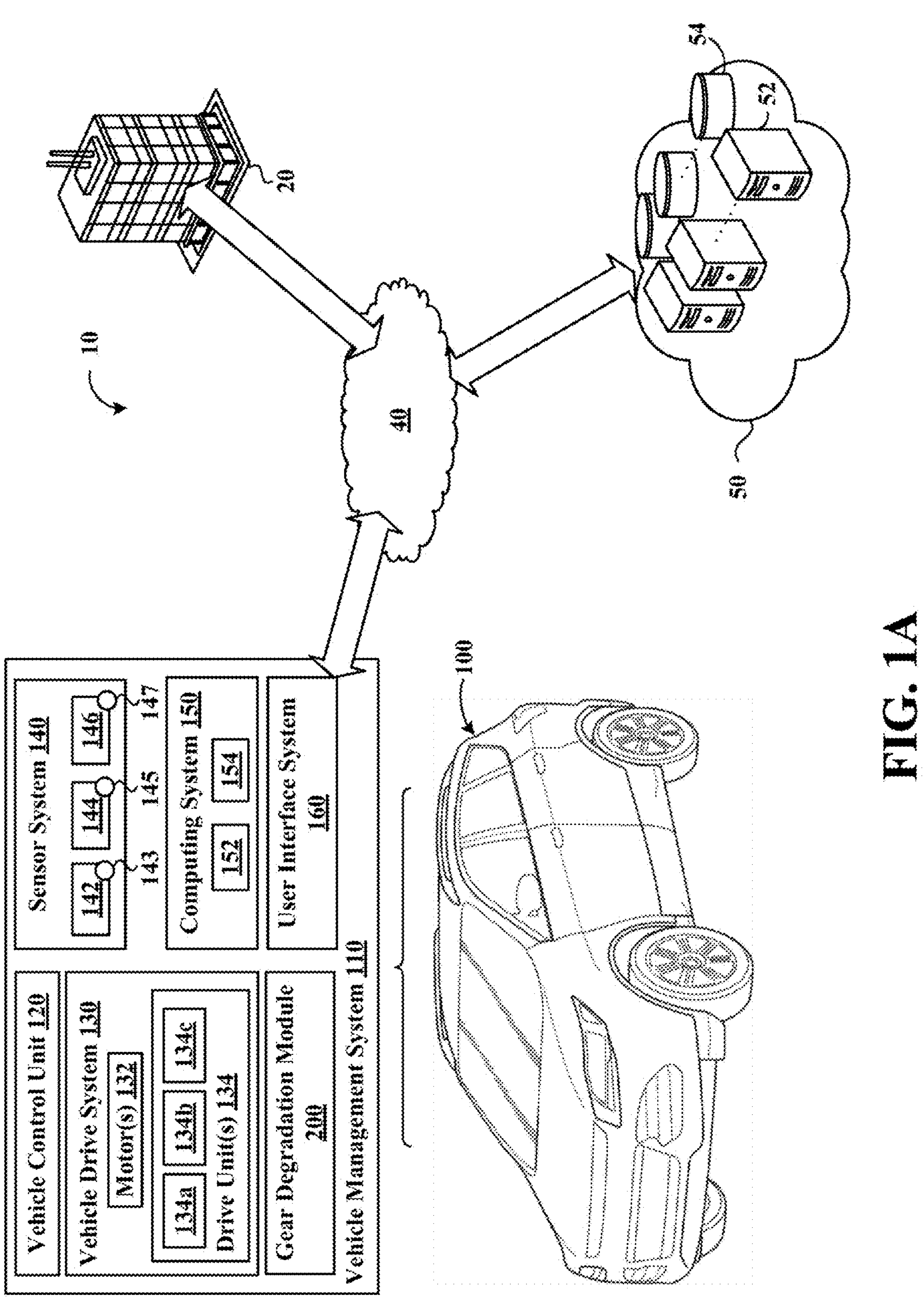
FIG. 1A is a schematic diagram of a vehicle environment including a vehicle management system according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 1B:
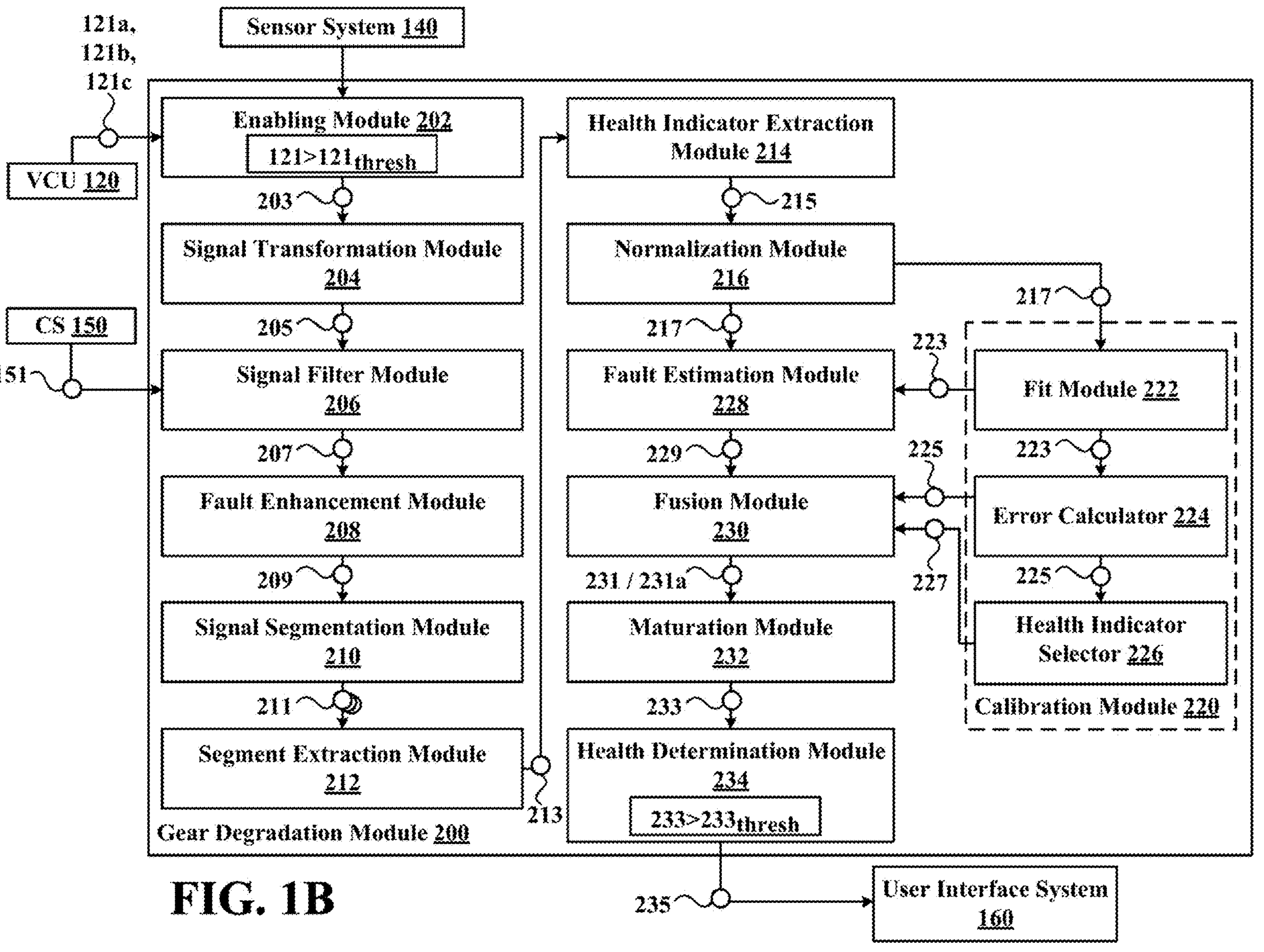
FIG. 1B is an enlarged schematic diagram showing an example of a gear degradation module of the vehicle management system of FIG. 1A.

Referring to FIGS. 1A and 1B, an example vehicle operating environment 10 is provided for illustration of the principles of the present disclosure. The vehicle operating environment 10 includes a vehicle 100. Optionally, the vehicle operating environment 10 may include a network 40 (e.g., the Internet, cellular networks), which allows the vehicle 100 to communicate with a remote vehicle computing system 50 and/or a remote vehicle monitoring system 20. For the sake of illustration, the vehicle operating environment 10 is shown as including a single vehicle monitoring center 20. However, in other examples, the vehicle operating environment 10 may include a plurality of vehicle monitoring centers 20 in communication with the vehicle 100 over the network 40. The vehicle monitoring center 20 may include a remote facility or system that receives and monitors outputs (e.g., notifications, reports, operating parameters) from the vehicle 100 and/or the remote vehicle computing system 50.

The vehicle 100 includes a vehicle management system 110 including a vehicle control unit (VCU) 120, a drive system 130, a sensor system 140, a computing system 150, a user interface system 160, and a gear degradation module 200. The vehicle control unit 120 is generally responsible for most processes related to the operation of the vehicle 100, including receiving one or more driver inputs and generating corresponding instructions for the vehicle drive system 130. For example, the vehicle control unit 120 may generate various outputs corresponding to vehicle operating parameters 121, 121*a*-121*c* based on the drive input and/or the sensor system 140, including a vehicle motor speed signal 121*a*, a vehicle motor torque signal 121*b*, and a vehicle power mode signal 121*c*. The vehicle power mode signal 121*c* represents whether the vehicle drive system 130 is in a power regeneration mode (i.e., negative torque at the motor 132) or a power output mode (i.e., positive torque at the motor 132).

The vehicle drive system 130 includes one or more power sources or motors 132 and one or more drive units 134. While the present disclosure relates to an electric vehicle having one or more electric motors 132 each connected to a drive unit 134, the systems and methods disclosed herein may also be applied to drive units (e.g., transmissions, transfer cases, etc.) used in hybrid vehicles and internal combustion engine vehicles. The drive unit 134 includes an arrangement of drive unit components 134*a*, 134*b*, 134*c* cooperating to transfer rotational motion from the one or more motors 132 to a drivetrain of the vehicle 100. For example, the drive unit 134 may include a plurality of gears 134*a* rotatably supported within a drive unit housing by corresponding shafts 134*b* and bearings 134*c*.

While the vehicle 100 maneuvers about the environment 10, the sensor system 140 includes various sensor subsystems 142, 144, 146 configured to gather sensor data 143, 145, 147 relating to operating characteristics of the drive unit 134. For instance, the sensor system 140 includes a speed sensor subsystem 142 including one or more sensors configured to measure speeds of drive unit components 134*a*, 134*b*, 134*c* and to provide corresponding drive unit speed signal 143. A torque sensor subsystem 144 of the drive unit 134 is configured to measure torques of the drive unit components 134*a*, 134*b*, 134*c* and to provide a corresponding drive unit torque signal 145. The speed sensor subsystem 142 and the torque sensor subsystem 144 may include resolver or current sensors within the motor 132 of the vehicle drive system 130, which measure speed and current (i.e., torque) fluctuations at the motor 132. A vibration sensor subsystem 146 includes one or more sensors configured to measure vibrations of the drive unit 134 and to provide sensor data in the form of a vibration signal 147. The vibration sensor subsystem 146 may include one or more accelerometers incorporated on a housing of the drive unit 134 to measure vibrations of the drive unit 134. While the following disclosure illustrates the gear degradation module 200 in use with the vibration signal 147, the speed signal 143 and/or the torque signal 145 may be evaluated by the gear degradation module 200 to determine a health status of the drive unit 134 using the same steps and modules.

As the sensor system 140 gathers the vibration sensor data 147, a computing system 150 is configured to store, process, and/or communicate the sensor data 147 within the vehicle operating environment 10. In order to perform computing tasks related to the sensor data 147, the computing system 150 of the vehicle 100 includes data processing hardware 152 and memory hardware 154. The data processing hardware 152 is configured to execute instructions stored in the memory hardware 154 to perform computing tasks related to operation and management of the vehicle 100. Generally speaking, the computing system 150 refers to one or more locations of data processing hardware 152 and/or memory hardware 154.

In some examples, the computing system 150 is a local system located on the vehicle 100 (e.g., vehicle control unit). When located on the vehicle 100, the computing system 150 may be centralized (i.e., in a single location/area on the vehicle 100, for example, a vehicle control unit), decentralized (i.e., located at various locations about the vehicle 100), or a hybrid combination of both (e.g., with a majority of centralized hardware and a minority of decentralized hardware). To illustrate some differences, a decentralized computing system 150 may allow processing to occur at an activity location (e.g., at the communication system 130) while a centralized computing system 150 may allow for a central processing hub that communicates to systems located at various positions on the vehicle 100 (e.g., communicate to the communication system 130).

Additionally or alternatively, the computing system 150 includes computing resources that are located remotely from the vehicle 100. For instance, the computing system 150 may communicate via the network 40 with a remote vehicle computing system 50 (e.g., a remote computer/server or a cloud-based environment). Much like the computing system 150, the remote vehicle computing system 50 includes remote computing resources such as remote data processing hardware 52 and remote memory hardware 54. Here, sensor data 147 or other processed data (e.g., data processing locally by the computing system 150) may be stored in the remote vehicle computing system 50 and may be accessible to the computing system 150. In some examples, the computing system 150 is configured to utilize the remote resources 52, 54 as extensions of the computing resources 152, 154 such that resources of the computing system 150 may reside on resources of the remote vehicle computing system 50.

Referring now to FIGS. 1B and 2A, the gear degradation module 200 and the corresponding operation thereof are provided in greater detail. While the gear degradation module 200 is schematically illustrated as a standalone module of the vehicle management system 100, it should be appreciated that the gear degradation module 200 may execute at the computing system 150 and/or the remote vehicle computing system 50, as discussed in the preceding paragraphs. Optionally, the gear degradation module 200 may be integrated as part of the vehicle control unit 120 or as a standalone module executed at the computing systems 50, 150 independently of the vehicle control unit 120. The gear degradation module 200 is configured to receive the vibration signal 147 from the vibration sensor 146 and to process the vibration signal 147 to determine a degradation state for the corresponding drive unit 134. In some examples, each gear 134*a* of the drive unit 134 may be isolated and evaluated by the gear degradation module 200 based on a known calculated critical frequency 151 for the gear 134*a*. Additionally, as discussed below, the gear degradation module 200 evaluates health status of the leading flanks and the trailing flanks for the teeth of each gear 134*a* of the drive unit 134. Thus, the gear degradation module 200 may independently evaluate the health state for each gear 134*a* and the respective flanks (e.g., drive flanks, regen flanks) thereof, thereby allowing a faulty gear 134*a* to be isolated to identify a specific fault location within the drive unit 134.

As shown in FIG. 1B, the gear degradation module includes an enabling module 202 configured to evaluate the vibration signal 147 and one or more of the operating parameters 121*a*, 121*b*, 121*c* to determine whether the gear degradation module 200 should be enabled (i.e., should the gear degradation module actively monitor the drive unit 134). Initially, the enabling module 202 may determine that the drive unit 134 is operating in a drive mode (i.e., positive torque at the motor 132) or a regeneration mode (i.e., negative torque at the motor 132) and generate corresponding enabling instructions 203. By determining that the drive unit 134 is operating in drive mode or regeneration mode, the enabling module 202 can generate different enabling instructions corresponding to each of the modes. This function allows the gear degradation module 200 to independently monitor health status of the leading flanks associated with a plurality of teeth of a drive unit 134 and the trailing flanks associated with the same plurality of teeth of the drive unit 134. For example, leading flanks that transfer forces associated with the drive mode of the vehicle 100 may experience different wear and degradation than trailing flanks that transfer forces associated with the regeneration mode of the vehicle. Thus, the gear degradation module 200 can evaluate the proper data set depending on whether the vehicle 100 is in drive mode or regeneration mode.

In addition to determining whether the drive unit is operating in the drive mode or the regeneration mode, the enabling module 202 generates enabling instructions 203 based on selected thresholds $\mathbf{121}_{thresh}$ associated with the operating parameters 121*a*, 121*b*, 121*c*. For example, when the vehicle motor speed signal 121*a* indicates that (i) the vehicle speed is within a first threshold range (i.e., between selected upper and lower vehicle speed limits), (ii) the vehicle motor torque signal 121*b* indicates that the vehicle torque is within a second threshold range (i.e., between selected upper and lower torque limits), and (ii) the vehicle power mode signal 121*c* indicates that the vehicle torque is less than zero (0) in regeneration mode or greater than zero (0) in drive mode, then the enabling module 202 generates enabling instructions 203 instructing the gear degradation module 200 to begin evaluating the vibration signal 147. The threshold ranges for each of the operating parameters 121*a*, 121*b* are calibrated values based on the characteristics of a particular vehicle 100 and/or the drive unit 134 to ensure that the gear degradation module 200 is enabled in operating ranges where the gear degradation module 200 is most likely to provide accurate results. Thus, the enabling module 202 serves as a gateway to ensure that the gear degradation module 200 only evaluates the vibration signal 147 within the desired operating ranges.

When the enabling module 202 determines that the vehicle operating parameters 121*a*, 121*b*, 121*c* are within the desired ranges, the enabling module 202 sends the enabling instructions 203 to a signal transformation module 204 of the gear degradation module 200. The signal transformation module 204 receives the vibration signal 147 from the sensor system 140 and transforms the vibration signal 147 from a time domain to a phase domain based on the vehicle motor speed signal 121*a*. Calculation of the critical frequency is based on the drive unit 134 parameters, such as number of gear teeth, gear geometry, operating condition, etc. For individual gears 134*a*, critical frequency is defined as gear mesh frequency (GMF), where it is the rate at which the teeth of meshing gears 134*a* engages and disengages as they transmit torque and rotation (individual gear teeth come into contact and mesh with each other during operation). Sidebands refer to frequencies around the GMF where frequency excitations appear due to disturbances in the gear mesh caused by irregularities in the drive unit 134 such as defects, misalignment, etc. Thus, the presence of sidebands indicates variations or disturbances in gear mesh caused by gear degradation.

The vehicle motor speed signal 121*a*, in the time domain, may be directly received by the signal transformation module 204 from the vehicle control unit 120 or included in the enabling instructions 203. The signal transformation module 204 evaluates each of the vehicle motor speed signal 121*a* and executes a phase domain synchronization to transform the vibration signal 147 from the time domain to the phase domain.

Referring still to FIG. 1B, the transformed vibration signal 205 is transmitted to a signal filter module 206 of the gear degradation module 200. The signal filter module 206 also receives the calculated critical frequencies 151, which are stored in the memory hardware of the computing system 50, 150 and obtained by the signal filter module 206. The signal filter module 206 is configured to filter vibrations of other drive unit components (e.g., shaft 134*b*, bearings 134*c*), as well as road-related noises and vibrations, from the transformed vibration signal 205 using the calculated critical frequencies 151, thereby isolating the vibrations associated with a targeted gear of the gears 134*a* of the drive unit 134. The signal filter module 206 applies a Time Synchronous Averaging (TSA) method to the transformed vibration signal 205 to filter vibrations associated with shafts, bearings, and other gears of the drive unit 134, thereby isolating a fault signature associated with the gears of the drive unit 134 from operational signatures associated with non-gear components of the drive unit 134. The number of gear cycles included in the time synchronous averaging is selected to optimize the time synchronous averaging. For example, more cycles may be included to improve performance at the expense of calculation time-to-detection, and vice versa. The signal filter module 206 applies one or more Time Synchronous Averaging signal processing variations (e.g., residual frequency, regular frequency, differential frequency) to the transformed vibration signal 205 to remove signal components associated with other gears and non-gear components, thereby resulting in a filtered vibration signal 207.

The filtered vibration signal 207 is received by a fault enhancement module 208 of the gear degradation module 200, which applies (i) a wavelet filter to the filtered vibration signal 207 to preserve the filtered vibration signal 207 relating to the drive unit 134 while further removing undesirable noise and (ii) an envelope filter to enhance a fault signature of the filtered vibration signal 207, resulting in an enhanced vibration signal 209.

Referring still to FIG. 1B, the gear degradation module 200 includes a signal segmentation module 210, which receives the enhanced vibration signal 209 and segments the enhanced vibration signal 209 into a plurality of signal segments by applying a Hanning window to the enhanced vibration signal 209. In this operation, the sizes of the segments are calibrated to balance performance and time-to-detection. The resulting segments or windows 211 are referred to as enhanced vibration signal segments 211. The enhanced vibration signal segments 211 are transmitted to a segment extraction module 212, which applies a Fast Fourier transformation (FFT) to each of the enhanced vibration signal segments 211 to generate a plurality of transformed enhanced vibration signal segments 213.

A health indicator extraction module 214 of the gear degradation module 200 receives the transformed enhanced vibration signal segments 213 and extracts one or more health indicators from each transformed enhanced vibration signal segment 213. As discussed in greater detail below, the gear degradation module 200 generally processes the health indicators 215 to evaluate whether the drive unit 134 is operating in a fault condition.

Figure 2:
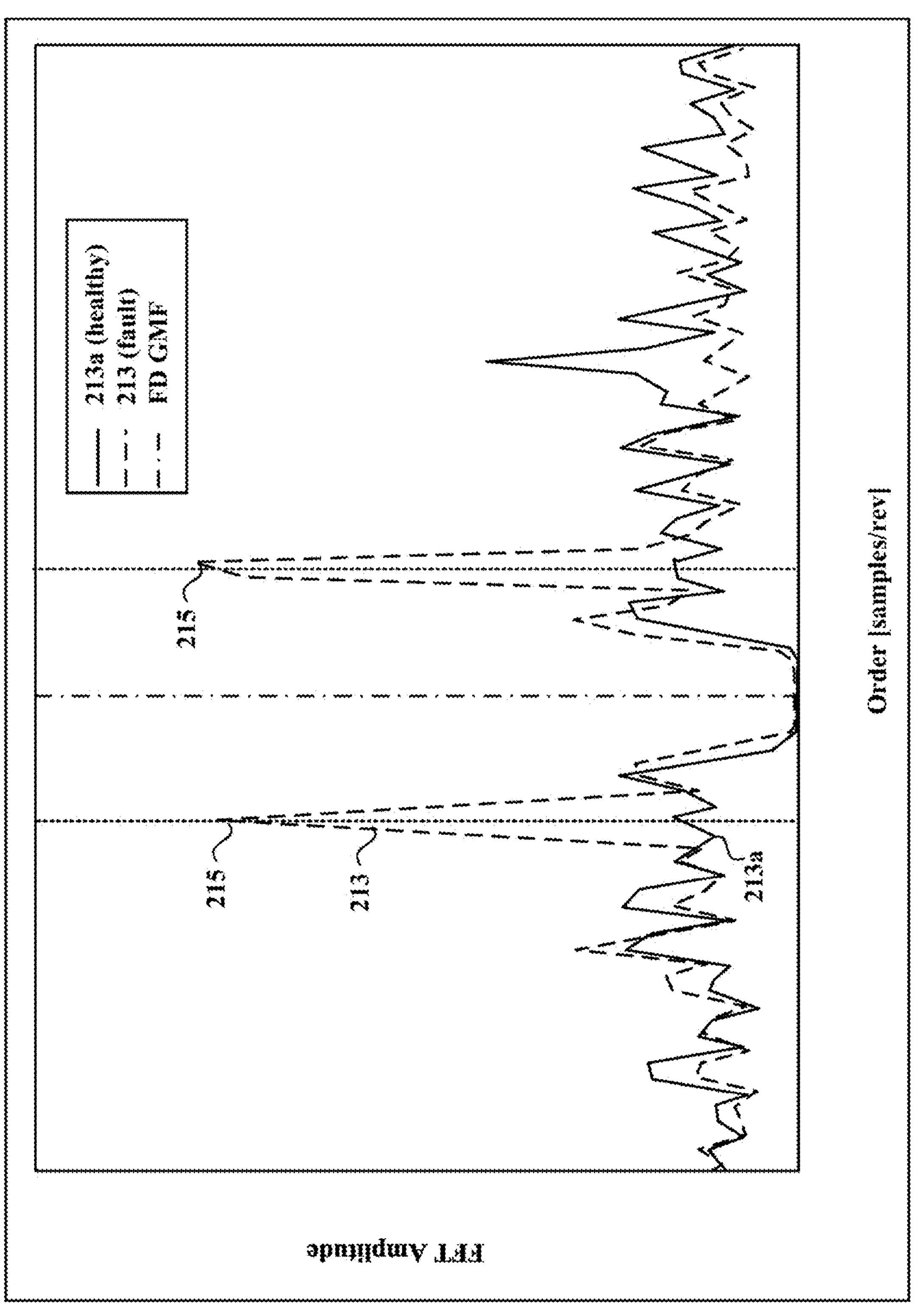
FIG. 2 is a chart showing an example output associated with a health indicator extraction operation in FIG. 1B.

The health indicators 215 are measured or calculated values of the transformed enhanced vibration signal segments 213 that correspond to operating characteristics of the drive unit 134. The health indicators 215 may be based on one or more of a gear mesh frequency (GMF), sidebands of the transformed enhanced vibration signal segments 213, and/or drive unit shaft frequencies. An example operation of the health indicator extraction module 214 is illustrated in FIG. 2. In this example, one of the transformed enhanced vibration signal segments 213 for a test drive unit 134 having a fault is evaluated relative to a baseline vibration signal segment 213*a* for a calibration drive unit known to be in good health. As shown, the amplitude of the transformed enhanced vibration signal segments 213 significantly exceeds the amplitude of the baseline vibration signal segment 213*a* in the sidebands, which are dependent on the particular geometry of the gear 134*a* being evaluated (as indicated by the dotted lines). The health indicator extraction module 214 identifies these anomalies and extracts the corresponding values as health indicators 215. In the example shown in FIG. 2, Time Synchronous Analysis residual was used and the GMF was attenuated, thereby allowing the sidebands of the GMF to be enhanced to improve identification of the health indicators.

While the illustrated example shows a single instance of the operation of the health indicator extraction module 214 relative to one of the transformed enhanced vibration signal segments 213, the gear degradation module 200 may execute a plurality of evaluations to extract any number of health indicators 215, which may be measured with different scales or units. The extracted health indicators 215 are processed at a normalization module 216 to normalize the values of the health indicators 215 for later use in calibration (e.g., at the calibration module 220) and estimation of the fault level (e.g., at the fault estimation module 228). Normalization is helpful to ensure that health indicators are evaluated against common thresholds and criteria across a wide range of gear sizes, operating parameters, and designs. For example, larger vibration in the time domain (i.e., due to larger torque or at higher speed) yields a larger spectrum amplitude, but does not necessarily mean that the fault level is larger. Accordingly, normalizing the health indicators accounts for such variations.

The normalization module 216 may normalize the extracted health indicators using a root mean square (RMS) or by using a window in the frequency domain. For example, using the root mean square (RMS), the normalization module 216 divides each of the extracted health indicators 215 by the root mean square (RMS) of each of the transformed enhanced vibration signal segments in the phase domain. Using the frequency domain, each of the extracted health indicators 215 is divided by the median of the Fast Fourier transformation (FFT) amplitudes of a window (selected in the frequency domain) centered at the calculated critical frequencies 151. Here, the window size is selected to include the fault signature, which includes the calculated critical frequency 151 and corresponding sidebands. The normalization module 216 outputs normalized health indicators 217, which are transmitted to the calibration module 220 and the fault estimation module 228 for independent evaluation.

The calibration module 220 is a peripheral module of the gear degradation module 200 and is used to develop the modeling parameters to be evaluated by the gear degradation module 200 to determine whether a drive unit 134 is faulty. Thus, it should be appreciated that the calibration module 220 is used as a development tool and does not function within the normal operations of the gear degradation module 200. The calibration module 220 includes a fit module 222, an error calculator 224, and a health indicator selector 226. The fit module 222 initially receives the normalized health indicators 217 and fits a regression model 223 to a comparison of each of the normalized health indicators 217 and the corresponding ground truth values of the fault levels based on the baseline vibration signal segment 213*a*. In other words, the values along the input of the regression model 223 represent the measured values of the respective normalized health indicator 217 and the values along the output of the regression model 223 represent ground truth values for each health indicator. Thus, the regression model 223 can be used to estimate a fault level for a measured value of the normalized health indicator.

The fault model 223 is received by the error calculator 224. The error calculator 224 determines an error value, which corresponds to a difference between the estimated fault level (output of the regression model 223) and the ground truth for the regression model 223 associated with each normalized health indicator 217. Based on the determined error value, the error calculator generates a health indicator weight value 225 for each of the normalized health indicators 217. The health indicator weight value 225 for each normalized health indicator 217 is equal to 1/(the determined error value), whereby normalized health indicators 217 having smaller error values are given a greater weight. The health indicator weight value 225 corresponds to a desired significance of a particular normalized health indicator 217 in estimating whether the gear component of the drive unit 134 is faulty. For example, normalized health indicators 217 having a relatively high error are given lesser weight in determining whether the drive unit 134 is faulty, while normalized health indicators 217 having a relatively low error are given a greater weight in determining whether the drive unit 134 is faulty.

The health indicator selector 226 of the calibration module 220 receives the health indicator weight values 225 corresponding to each of the candidates of the normalized health indicators 217 and selects which of the candidates will be included in a health indicator list 227 used by the gear degradation module 200 in determining a health status of the drive unit 134. The health indicator selector 226 executes a forward selection for each of the normalized health indicators 217 to determine which of the normalized health indicators 217 should be included in the health indicator list 227 to improve the evaluation of the gear degradation module 200. The health indicator selector 226 evaluates various criteria for selecting each normalized health indicator 217, including, but not limited to, modeling error, receiver operating characteristic (ROC) values for each fault level, monotonicity, and robustness. Thus, the calibration module 220 outputs each of a fault (regression) model 223 for each normalized health indicator 217, a health indicator weight value 225 for each normalized health indicator 217, and a health indicator list 227 indicating which normalized health indicators 217 should be provided to the gear degradation module 200.

Referring still to FIG. 1B, the gear degradation module 200 includes the fault estimation module 228, which receives the normalized health indicators 217 from the normalization module 216 and the corresponding fault models 223 from the fit module 222 of the calibration module 220. The fault estimation module 228 applies the fault models 223 to each of the normalized health indicators 217 to generate a fault level estimate 229 for each of the normalized health indicators 217. Thus, where the health indicator extraction module 214 initially extracts a first plurality of health indicators 215 and each of the health indicators 215 included in the first plurality of health indicators 215 is normalized, each of the corresponding normalized health indicators 217 is independently evaluated against a respective fault model 223 to estimate a level or magnitude of the fault represented by the respective normalized health indicator 217. The fault estimation module 228 generates a corresponding fault level estimate 229 for each of the normalized health indicators 217.

The fault level estimates 229, the health indicator weight values 225 for each of the normalized health indicators 217, and the health indicator list 227 are received by a fusion module 230 of the gear degradation module 200. The fusion module 230 fuses or aggregates the fault level estimates 229 using the health indicator weight values 225 and the health indicator list 227 to generate a fused health indicator 231. For example, the fusion module 230 aggregates the fault level estimates 229 by adding the values of each of the fault level estimates 229 together to determine the total value of the fused health indicator 231. The fusion module 230 may apply the health indicator weight values 225 to each of the corresponding fault level estimates 229 to adjust the weight or influence that each fault level estimates 229 has on the fused health indicator 231. For example, a first one of the fault level estimates 229 may have a first health indicator weight value 225 that is greater than a second health indicator weight value 225 associated with a second one of the fault level estimates 229, whereby the first fault level estimate 229 has a greater influence on the fused health indicator 231 based on the first health indicator weight value 225.

Referring still to FIG. 1B, the gear degradation module 200 includes a maturation module 232, which receives (i) fused health indicator 231 from the fusion module 230. The maturation module 232 applies a moving average (e.g., simple average, median) to the fused health indicator 231 over a desired period to generate a matured health indicator 233. Thus, the maturation module 232 may receive a plurality of the fused health indicators 231 over a period-of-time or some other desired period (e.g., a number of drive unit cycles) to determine the matured health indicator 233. The size of the maturation period is selected to balance performance and time-to-detection. For example, a larger maturation size will improve performance, but may increase time-to-detection.

In one example, the maturation module 232 processes the composite health indicator scores 231, whereby each fused health indicator 231 represents a composite value calculated by the fusion module 230. In other words, the maturation module 232 averages a single value associated with each of the health indicator scores 231 received from the fusion module 230. Alternatively, the maturation module 232 may receive a fusion model 231*a* from the fusion module 232, whereby the fusion model 231*a* includes each of the fault value estimates 229 and corresponding health indicator weight values 225. In this configuration, the maturation module 232 applies the moving average to each of the estimated fault value estimates 229 independently and generates the average health indicator score 233. Thus, the average health indicator score 233 may be calculated based on either or both of the composite health indicator scores 231 or the fusion model 231*a*.

The average health indicator score 233 is received by a health determination module 234, which evaluates the average health indicator score 233 against one or more health indicator score thresholds $\mathbf{233}_{thresh}$ to determine whether a gear component of the drive unit 134 is in a fault condition. When the average health indicator score 233 exceeds the health indicator score threshold $\mathbf{233}_{thresh}$, the health determination module 234 determines that the drive unit 134 is in a fault condition. Conversely, when the average health indicator score 233 does not exceed the health indicator score threshold $\mathbf{233}_{thresh}$, the health determination module 234 determines that the drive unit 134 is not in a fault condition. In some examples, each gear 134*a* of the drive unit 134 may be isolated based on a known calculated critical frequency 151 for the gear 134*a*. The gear degradation module 200 executes the aforementioned steps for each gear 134*a* of the drive unit 134. Thus, the gear degradation module 200 may independently evaluate the health state for each gear 134*a* and the respective flanks (e.g., drive flanks, regen flanks) thereof, thereby allowing a faulty gear 134*a* to be isolated to identify a specific fault location within the drive unit 134.

The health determination module 234 then communicates a gear health notification 235 to the user interface system 160 of the vehicle 100 indicating a fault condition of the drive unit 134. For example, the gear health notification 235 may be presented to a vehicle operator as a visual or audible notification via the user interface 160 and/or the monitoring center 20. Optionally, the health determination module 234 may be configured to communicate the gear health notification 235 only when the health determination module 234 determines that the drive unit 134 is in a fault condition. For example, the gear health notification 235 may be a binary notification (e.g., fault, no fault). Alternatively, the gear health notification 235 may be a scalar notification (e.g., drive unit health score 0-100). The health determination module 234 may communicate the health notification 235 to the remote monitoring center 20 via the network 40, whereby the remote monitoring center 20 can review the health notification 235 and provide responsive actions (e.g., maintenance reminders, supplemental diagnostics, mitigation actions).

Figure 3:
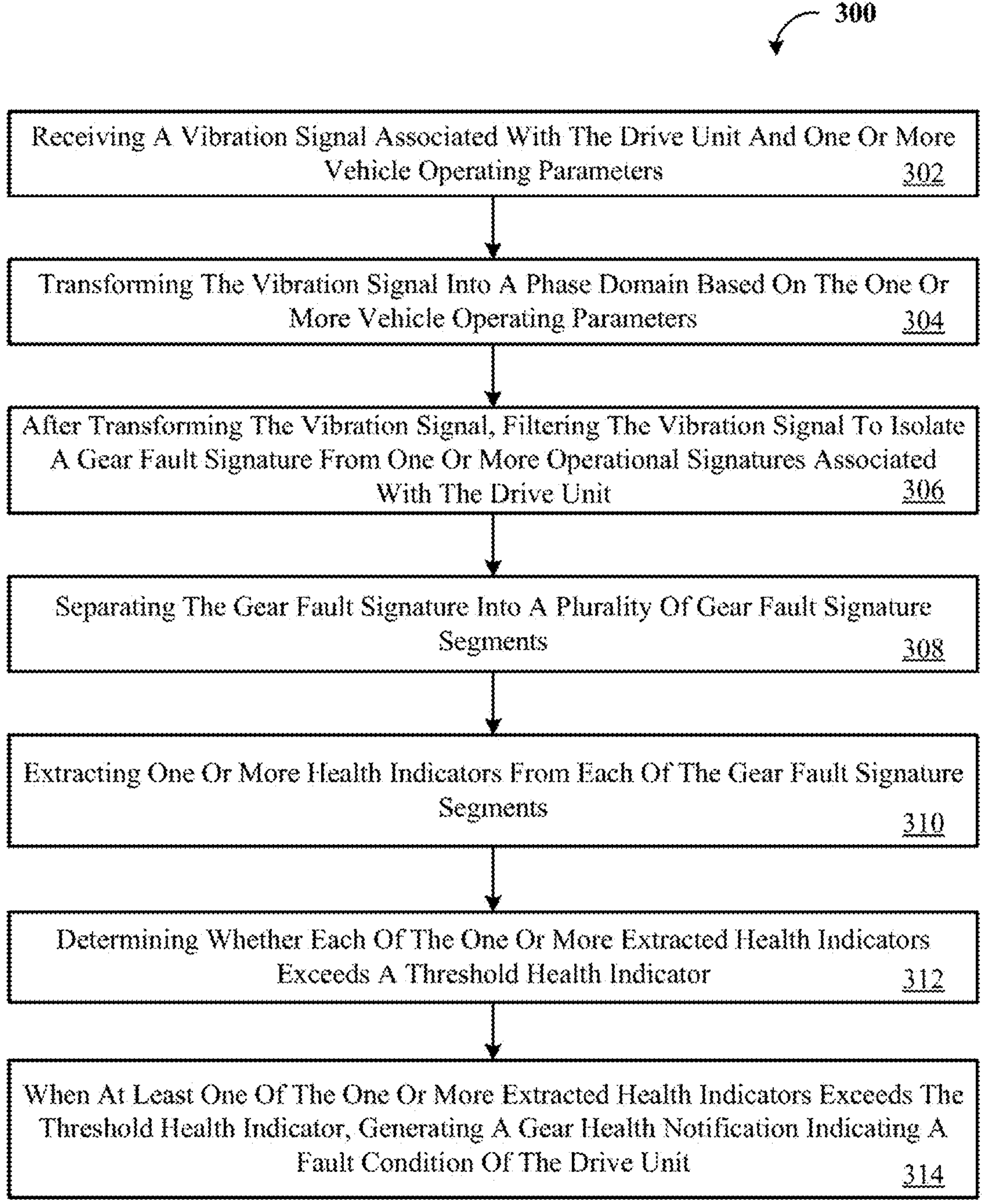
FIG. 3 is an example method of operating the gear degradation module of FIG. 1A.

FIG. 3 illustrates an example method of operating the gear degradation module 200 according to the principles of the present disclosure. At step 302, the gear degradation module 200 receives a vibration signal associated with the drive unit and one or more vehicle operating parameters. At step 304, the gear degradation module transforms the vibration signal into a phase domain based on the one or more vehicle operating parameters. After transforming the vibration signal, the gear degradation module 200 filters the vibration signal at step 306 to isolate a gear fault signature from one or more operational signatures associated with the drive unit. At step 308, the gear degradation module separates the gear fault signature into a plurality of gear fault signature segments. At step 310, the gear degradation module extracts one or more health indicators from each of the gear fault signature segments. At step 312, the gear degradation module determines whether each of the one or more extracted health indicators exceeds a threshold health indicator. When at least one of the one or more extracted health indicators exceeds the threshold health indicator, the gear degradation module generates a gear health notification indicating a fault condition of the drive unit.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware of a vehicle having a drive unit, causes the data processing hardware to perform operations comprising:

receiving sensor data associated with the drive unit;

receiving one or more vehicle operating parameters comprising a motor speed signal;

transforming the sensor data into a phase domain based on the motor speed signal;

after transforming the sensor data, filtering the transformed sensor data with a time-synchronous averaging process to isolate a gear fault signature from one or more operational signatures associated with the drive unit;

separating the gear fault signature into a plurality of gear fault signature segments;

extracting one or more health indicators from each of the gear fault signature segments;

estimating, for each of the one or more health indicators, a respective fault level estimate;

fusing the respective fault level estimates to generate a fused health indicator;

determining whether the fused health indicator exceeds a threshold health indicator; and when the fused health indicator exceeds the threshold health indicator, generating a gear health notification indicating a fault condition of the drive unit.

2. The method of claim 1, further comprising:

determining whether one or more of the vehicle operating parameters exceeds a vehicle operating parameter threshold; and when one or more of the vehicle operating parameters exceeds the vehicle operating parameter threshold, generating enabling instructions to initiate the operation of transforming the sensor data.

3. The method of claim 1, further comprising enhancing the gear fault signature.

4. The method of claim 3, wherein enhancing the gear fault signature includes applying at least one of a wavelet filter or an envelope filter to the gear fault signature.

5. The method of claim 1, further comprising applying a Fast Fourier transformation to each of the gear fault signature segments.

6. The method of claim 1, further comprising normalizing each of the health indicators.

7. The method of claim 1, wherein fusing the respective fault level estimates to generate a fused health indicator comprises aggregating each of the health indicators to determine the fused health indicator.

8. The method of claim 7, wherein determining the fused health indicator includes applying a respective health indicator weight value to each of the health indicators.

9. A system for a vehicle having a drive unit, the system comprising:

data processing hardware; and memory hardware in communication with the data processing hardware, the memory hardware storing instructions that, when executed on the data processing hardware, cause the data processing hardware to perform operations comprising:

receiving a vibration signal associated with the drive unit;

receiving one or more vehicle operating parameters comprising a motor speed signal;

transforming the vibration signal into a phase domain based on the vibration signal;

after transforming the vibration signal, filtering the transformed vibration signal with a time-synchronous averaging data to isolate a gear fault signature from one or more operational signatures associated with the drive unit;

separating the gear fault signature into a plurality of gear fault signature segments;

extracting one or more health indicators from each of the gear fault signature segments;

estimating, for each of the one or more health indicators, a respective fault level estimate;

fusing the respective fault level estimates to generate a fused health indicator;

determining whether the fused health indicator exceeds a threshold health indicator; and when the fused health indicator exceeds the threshold health indicator, generating a gear health notification indicating a fault condition of the drive unit.

10. The system of claim 9, further comprising:

determining whether one or more of the vehicle operating parameters exceeds a vehicle operating parameter threshold; and when one or more of the vehicle operating parameters exceeds the vehicle operating parameter threshold, generating enabling instructions to initiate the operation of transforming the vibration signal.

11. The system of claim 9, further comprising enhancing the gear fault signature.

12. The system of claim 11, wherein enhancing the gear fault signature includes applying at least one of a wavelet filter or an envelope filter to the gear fault signature.

13. The system of claim 9, further comprising applying a Fast Fourier transformation to each of the gear fault signature segments.

14. The system of claim 9, further comprising normalizing each of the health indicators.

15. The system of claim 9, wherein fusing the respective fault level estimates to generate a fused health indicator comprises aggregating each of the health indicators to determine the fused health indicator.

16. The system of claim 15, wherein determining the fused health indicator includes applying a respective health indicator weight value to each of the health indicators.

17. A vehicle comprising:

a drive unit;

data processing hardware; and memory hardware in communication with the data processing hardware, the memory hardware storing instructions that, when executed on the data processing hardware, cause the data processing hardware to perform operations comprising:

receiving a vibration signal associated with the drive unit;

receiving one or more vehicle operating parameters comprising a motor speed signal;

transforming the vibration signal into a phase domain based on the vibration signal;

after transforming the vibration signal, filtering the transformed vibration signal with a time-synchronous averaging process to isolate a gear fault signature from one or more operational signatures associated with the drive unit;

separating the gear fault signature into a plurality of gear fault signature segments;

extracting one or more health indicators from each of the gear fault signature segments;

estimating, for each of the one or more health indicators, a respective fault level estimate;

fusing the respective fault level estimates to generate a fused health indicator;

determining whether the fused health indicator exceeds a threshold health indicator; and when the fused health indicator exceeds the threshold health indicator, generating a gear health notification indicating a fault condition of the drive unit.

18. The vehicle of claim 17, further comprising:

determining whether one or more of the vehicle operating parameters exceeds a vehicle operating parameter threshold; and when one or more of the vehicle operating parameters exceeds the vehicle operating parameter threshold, generating enabling instructions to initiate the operation of transforming the vibration signal.

19. The vehicle of claim 17, further comprising enhancing the gear fault signature.

20. The vehicle of claim 19, wherein enhancing the gear fault signature includes applying at least one of a wavelet filter or an envelope filter to the gear fault signature.

* * * * *